(12) United States Patent
Kezuka

(10) Patent No.: US 6,355,378 B2
(45) Date of Patent: *Mar. 12, 2002

(54) SOLID STATE ELECTROLYTE CELL HAVING AT LEAST ONE ELECTRODE IMPREGNATED WITH A SOLID ELECTROLYTE

(75) Inventor: Koichiro Kezuka, Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,831

(22) Filed: Oct. 28, 1998

(30) Foreign Application Priority Data

Oct. 29, 1997 (JP) ................................. 9-297555

(51) Int. Cl.⁷ ................................. H01M 6/18

(52) U.S. Cl. ................. 429/304; 429/300; 429/306; 429/317; 429/217; 429/231.1; 429/231.8

(58) Field of Search ................. 429/300, 304, 429/306, 317, 217, 231.1, 231.8

(56) References Cited

U.S. PATENT DOCUMENTS 5,436,092 A * 7/1995 Ohtsuka et al. ............. 429/194
5,922,493 A * 7/1999 Humphrey, Jr. et al. ..... 429/316

FOREIGN PATENT DOCUMENTS

JP 40-9022725 * 1/1997
JP 40-9035749 * 2/1997

* cited by examiner

Primary Examiner—Laura Weiner
(74) Attorney, Agent, or Firm—Sonnenschein, Nath & Rosenthal

(57) ABSTRACT

A solid electrolyte cell in which the state of electrical contact between the solid electrolyte and the layers of active materials of the positive and negative electrodes and the inter-particulate distance in the layers of active materials of the positive and negative electrodes can be optimized to assure superior load characteristics, and a method for manufacturing the cell. The method for manufacturing a solid electrolyte cell includes a step of applying a paint containing an active material and a binder to a current collector to form a layer of an active material, and a step of impregnating a solid electrolyte in the layer of the active material formed by the active material layer forming step. The impregnating step includes applying the paint comprised of the solid electrolyte dissolved in a solvent on the layer of the active material to allow the paint to be permeated into the layer of the active material, and subsequently drying the solvent.

16 Claims, 2 Drawing Sheets

SOLID STATE ELECTROLYTE CELL HAVING AT LEAST ONE ELECTRODE IMPREGNATED WITH A SOLID ELECTROLYTE

BACKGROUND OF THE INVENTION

1. Field of the Invention

This invention relates to a solid electrolyte cell in which a solid electrolyte is impregnated in a positive electrode active material or in a negative electrode active material, and a method for producing the cell.

2. Description of the Related Art

Recently, many types of portable electronic equipments, such as a video tape recorder with a built-in camera, portable telephone or a portable computer, have made their debut, and attempts are being made for reducing their size and weight. Also, researches into cells as portable power sources of these electronic equipments, in particular the secondary cells, are proceeding. Of lithium cells, among these secondary cells, researches and investigations into the thin type cell or foldable cells are proceeding most briskly. As the electrolytes for these cells, investigations into the solid electrolyte obtained on solidifying the electrolyte, are proceeding energetically. In particular, high molecular solid electrolyte having lithium salts dissolved in the high-molecular material or the gelated solid electrolyte containing a plasticizer, are stirring up notice.

With the solid electrolyte, the cell can be reduced in thickness more significantly than with the liquid electrolyte, while there is no risk of leakage of the cell contents. However, if the solid electrolyte is used in a cell, it is not fluid as is the liquid electrolyte, so that it can hardly be contacted in an ideal state with the electrode. Since ions are migrated in the cell through the solid electrolyte or the gelated electrode, the contacting state between the solid electrolyte and the electrode affects the cell performance significantly. If the contacting state between the solid electrolyte and the electrode is poor, the contact resistance between the solid electrolyte and the electrode is increased to increase the internal resistance of the cell. Moreover, ions cannot be migrated in an ideal state between the solid electrolyte and the electrode to decrease the cell capacity. It is therefore crucial for the solid electrolyte to have a sufficiently tight contact with a layer of the active material of the electrode.

It is reported in Japanese Laying-Open Patent H-2-40867 to use a positive electrode composite, obtained on adding a solid electrolyte to the layer of the active material of the positive electrode to improve the contact state between the solid electrolyte and the electrode. In the cell disclosed in this publication, a portion of the solid electrolyte is mixed to a layer of the active material of the positive electrode to improve the state of electric contact between the solid electrolyte and the electrode.

With the cell disclosed in this publication, since the positive electrode plate is fabricated using a positive electrode composite admixed with the solid electrolyte, and a solid electrolyte is layered on the positive electrode plate, it is difficult to realize an ideal contact state between the positive electrode plate and the solid electrolyte. In particular, if the solid electrolyte having a roughed surface is layered on the electrode layer, the two are bonded only in a poor contact state to increase the internal resistance, thus worsening the load characteristics.

Moreover, the positive electrode composite admixed with the solid electrolyte, or the negative electrode composite, cannot be pressed sufficiently because of the elasticity proper to the solid electrolyte to increase the inter-particulate distance in the composite and hence the internal resistance, thus again worsening the load characteristics.

In addition, the positive electrode composite admixed with the solid electrolyte, or the negative electrode composite, need to be fabricated at low humidity to prevent decomposition of the electrolytic salt contained in the solid electrolyte. This not only raises difficulties in quality control but increases the cost significantly.

SUMMARY OF THE INVENTION

It is therefore an object of the present invention to provide a solid electrolyte cell in which the electrical contact state between the solid electrolyte and the layers of the active materials of the positive and negative electrodes and the inter-particulate distance in the layers of the active materials of the positive and negative electrodes can be optimized to assure superior load characteristics, and a method for producing the solid electrolyte cell.

In one aspect, the present invention provides a solid electrolyte cell including an electrode having a current collector and a layer of an active material formed on the current collector and containing an active material and a binder, in which a solid electrolyte layer is formed by impregnating a solid electrolyte dissolved in a solvent into the layer of the active material.

In the solid electrolyte cell of the present invention, since the solid electrolyte is impregnated in the layer of the active material, adhesion between the electrolyte and the active material is improved.

In another aspect, the present invention provides a method for manufacturing a solid electrolyte cell including the steps of applying a paint containing an active material and a binder to a current collector to form a layer of an active material, and impregnating a solid electrolyte in the layer of the active material formed by the active material layer forming step. The impregnating step includes applying the paint comprised of the solid electrolyte dissolved in a solvent on the layer of the active material to allow the paint to be permeated into the layer of the active material and subsequently drying the solvent.

In the manufacturing method of the solid electrolyte cell according to the present invention, the paint containing the active material and the binder is coated on the current collector to form a layer of the active material during the active material layer forming step. In the impregnating step, the paint comprised of the solid electrolyte dissolved in the solvent is applied on the layer of the active material to allow the paint to be permeated into the active material layer. The solvent is then dried to impregnate the solid electrolyte in the active material layer. In the manufacturing method of the solid electrolyte cell according to the present invention, the adhesion between the solid electrolyte and the active material is improved by impregnation of the solid electrolyte into the layer of the active material.

Thus, the contacting performance between the active material ands the electrolyte is improved to reduce the internal resistance to achieve a cell having superior load characteristics.

DESCRIPTION OF THE PREFERRED EMBODIMENTS

Figure 1:
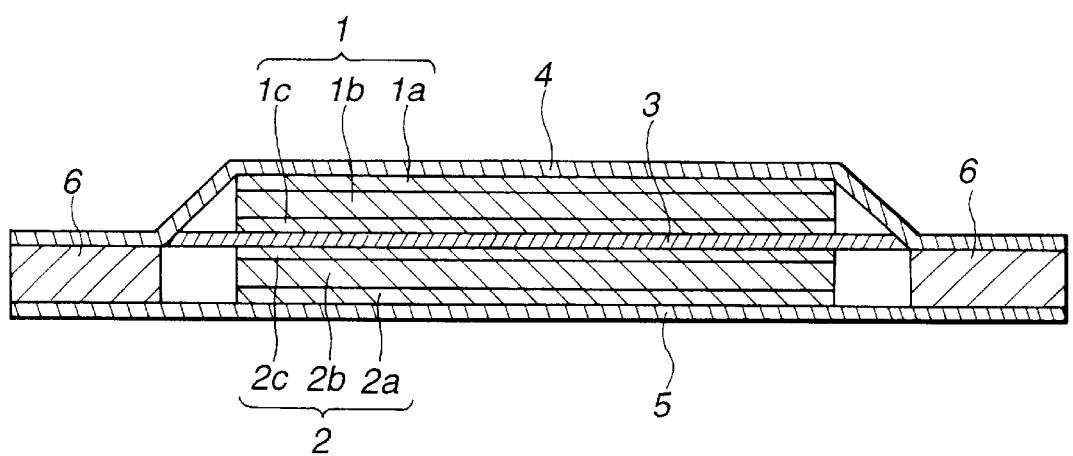
FIG. 1 is a cross-sectional view showing an illustrative structure of a solid electrolyte cell according to the present invention.

An illustrative structure of a solid electrolyte cell according to the present invention is shown in FIG. 1. The solid electrolyte cell includes a positive electrode plate 1, comprised of a positive current collector 1a and a layer of an active material of the positive electrode 1b formed on the positive current collector and a solid electrolyte layer 1c formed on the layer of active material, a negative electrode plate, comprised of a layer of an active material of a negative electrode 2b and a solid electrolyte layer 2c formed on a negative electrode collector 2a, and a separator 3 for separating the positive electrode plate 1 from the negative electrode plate 2. The solid electrolyte cell also includes a sheathing material 4 for holding the positive electrode plate 1, a sheathing material 5 for holding the negative electrode plate 5 and a hot melt material 6 for bonding the sheathing material 4 and 5 together.

The positive electrode plate 1 is comprised of a metal foil, such as an aluminum foil, serving as a positive electrode collector 1a, and a positive electrode mixture containing the active material for the positive electrode and the binder coated thereon and dried in situ to form the layer of the active material of the positive electrode 1b. On the layer of the active material of the positive electrode 1b is also formed a solid electrolyte layer 1c, as will be explained subsequently.

For the active material for the positive electrode, metal oxides, metal sulfides or specified high-molecular materials may be used depending on the type of the cell under consideration.

For constructing a lithium ion cell, for example, metal sulfides or oxides, such as $TiS_2$, $MoS_2$, $NbSe_2$ or $V_2O_5$ may be used as the active material for the positive electrode. Also, lithium compound oxides, formed mainly by $Li_xMO_2$, where M denotes one or more transition metals and x is usually not less than 0.05 and not larger than 1.10 depending on the charging/discharging state of the cell. As the transition metals M making up the lithium compound oxides, Co, Ni or Mn is preferred. Specified examples of the lithium compound oxides include $LiCoO_2$, $LiNiO_2$, $LiNi_yCO_{1-y}O_2$, where 0<y<1, and $LiMn_2O_4$. These lithium compound oxides, capable of generating high voltage, can serve as an active material for the positive electrode having excellent energy density. Plural sorts of the active materials for the positive electrode can be used in combination as the positive electrode.

As a binder for the positive electrode mixture, any suitable known binder may be used, while an electrically conductive agent or any suitable known additive may be added to the positive electrode mixture.

As for the negative electrode plate 2, a negative electrode mixture containing the active material for the negative electrode and the binder is coated on a metal foil, such as a copper foil, acting as a negative electrode collector 2a, and is dried in situ to constitute a layer of an active material for the negative electrode 2b. On the layer of an active material for the negative electrode 2b is further formed a solid electrolyte layer 2c, as will be explained subsequently.

For producing the lithium ion cell, it is preferred to use a material capable of doping/undoping lithium as the active material for the negative electrode. Examples of the material capable of doping/undoping lithium include a carbonaceous material difficult to graphatize and a graphite-based carbon material.

The above-mentioned carbonaceous materials may be enumerated by pyrolytic carbon, cokes, graphites, vitreous carbon fibers, fired organic high-molecular compounds, carbon fibers and activated charcoal. The cokes may be enumerated by pitch coke, needle coke and petroleum coke. The fired organic high-molecular compounds mean phenolic resins or furan resins fired and carbonated at a suitable temperature.

In addition to the carbon materials, high-molecular materials, such as polyacetylene or polypyrrole, or oxides, such as $SnO_2$, may be used as the capable of doping/undoping lithium.

As a binder for the negative electrode mixture, the above-mentioned negative electrode mixture admixed with known additives may be used in addition to known binders.

In the solid electrolyte cell of the present embodiment, a solid electrolyte layer 1c is formed on the layer of an active material of the positive electrode 1b and a solid electrolyte layer 2c is formed on the layer of an active material of the negative electrode 2b. These solid electrolyte layers 1c, 2c are formed by impregnating the active material of the positive electrode 1b or the active material of the negative electrode 2b with a solid electrolyte. By impregnating layers of the active material with the solid electrolyte, the internal resistance of the cell is decreased, while the contact state between the active material and the solid electrolyte layer is improved.

It is desirable for the solid electrolyte used in the solid electrolyte cell of the present embodiment to contain a plasticizer and to be in a gelated state. By using the gelated solid electrolyte, it is possible to improve the contact state between the electrolyte and the active material and to render the cell flexible. In the following explanation, the gelated solid electrolyte containing the plasticizer is termed a gelated electrolyte.

For the plasticizer, esters, ethers or carbonic acid esters may be used alone or as a component of the plasticizer. The content of the plasticizer is preferably not less than 10 wt % and not more than 80 wt % based on the content of the gelated electrolyte. If the plasticizer content is larger than 80 wt %, mechanical strength cannot be maintained, even if the ionic conductivity is that high. If the content of the plasticizer is less than 10 wt %, ionic conductivity is low, even if the mechanical strength is high. The content of the plasticizer is preferably not less than 10 wt % and not more than 80 wt % based on the content of the gelated electrolyte for optimum tradeoff between the ionic conductivity and the mechanical strength.

The plasticizer also contains lithium salts. As lithium salts used in the gelated electrolyte according to the present invention, those used for the usual cell liquid electrolyte may be used. Examples of the lithium salts include $LiPF_6$, $LiBF_4$, $LiAsF_6$, $LiClO_4$, $LiCF_3FO_3$, $LiN(SO_2CF_3)_2$, $LiC(SO_2CF_3)_3$, $LiAlCl_4$ and $LiSiF_6$. Of these, $LiPF_6$ and $LiBF_4$ are preferred for oxidation stability. Although the concentration of lithium salts of not less than 0.1 mol/l and not larger than 3.0 mol/l is acceptable, it is desirably not less than 0.5 mol/l and not larger than 2.0 mol/l.

As the high-molecular matrix material used for gelating the above-mentioned plasticizers, a variety of high-molecular materials used in constructing the gelated electrolyte may be used. Specifically, fluorine-based high-molecular materials, such as polyvinylidene fluoride or a copolymer of polyvinylidene fluoride with hexafluoro propylene, etheric high-molecular materials, such as polyethylene oxide or cross-linked polyethylene oxide, methacrylate esteric high-molecular materials, acrylate high-molecular materials or polyacrylonitrile, may be used alone or in a mixture. Of these, the fluorine-based high-molecular materials are preferred since these improve stability in oxidation and reduction.

The high-molecular matrix material is preferably used in an amount of not more than 10 wt % and not less than 50 wt % based on the weight of the gelated electrolyte.

The solid electrolyte cell of the present invention is fabricated as follows:

The positive electrode is prepared by evenly coating a positive electrode mixture containing the active material for the positive electrode and the binder on a metal foil, such as an Al foil, functioning as a positive electrode collector 1a, and drying the mixture in situ to form a layer of an active material of the positive electrode 1b. As the binder for the positive electrode mixture, any suitable known binder may be used, while any suitable known additive may be added to the positive electrode mixture.

The solid electrolyte layer 1c is formed on the layer of the active material of the positive electrode 1b to provide the positive electrode plate 1, while the solid electrolyte layer 2c is formed on the layer of an active material of the negative electrode 2b to provide the negative electrode plate 2.

For preparing the solid electrolyte layers 1c, 2c, a plasticizer containing lithium salts and a high-molecular matrix material are dissolved in a solvent to prepare an electrolyte solution which is then uniformly coated on the layer of an active material of the positive electrode 1b and the layer of an active material of the negative electrode 2b. The electrolyte solution is impregnated in the layer of an active material of the positive electrode 1b and the layer of an active material of the negative electrode 2b and finally the solvent is removed to gelate the electrolyte. The resulting gelated electrolyte is impregnated in the active materials to prepare solid electrolyte layers 1c, 2c.

The positive electrode plate 1 and the negative electrode plate 2, are housed in the sheathing material 4 for the positive electrode 1 and in the sheathing material 5 for the negative electrode 2, respectively. The sheathing material 4 for housing the positive electrode plate 1 and the sheathing material 5 for housing the negative electrode plate 2 are layered via a separator 3 so that the gelated electrolyte layer 1c and the gelated electrolyte layer 2c will face each other via the separator 3. Finally, the outer rim portions of the sheathing material for the positive electrode 1 and the sheathing material for the negative electrode 2 are thermally fused together via hot-melt agent 6 and hermetically sealed together to complete the solid electrolyte cell.

The separator 3 means a separator-insulator provided between n the positive and negative electrodes. Any suitable known porous films of, for example, polyethylene, polypropylene, polyamide or vinylidene polyfluoride, used as the separator for the cell, may be used as the separator 3.

Figure 2:
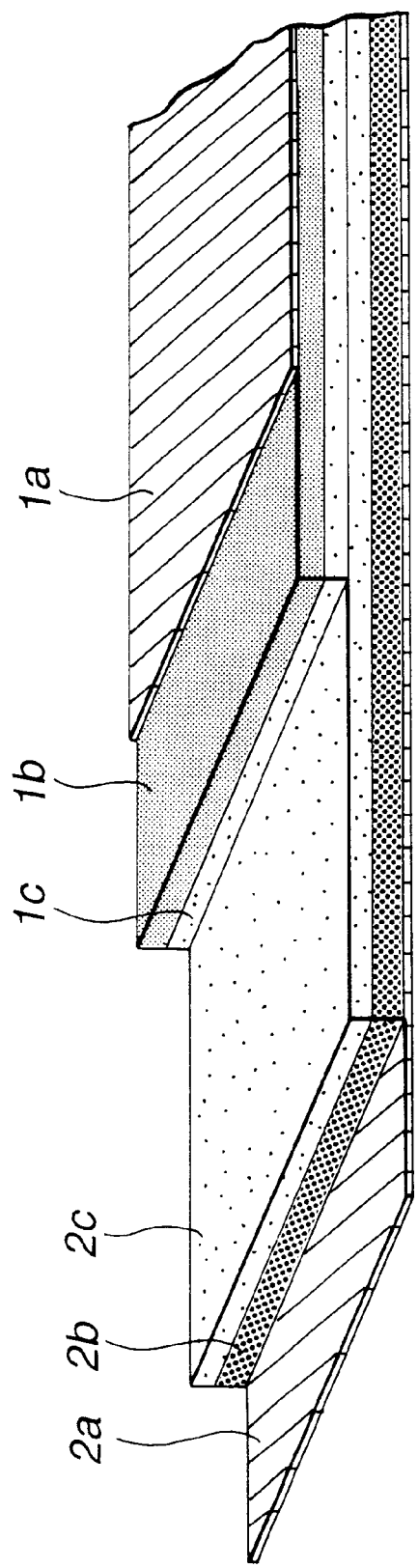
FIG. 2 is a schematic perspective view showing only essential portions of another illustrative structure of a solid electrolyte cell according to the present invention.

Although the porous film is used in the above-described embodiments as the separator, the present invention is not limited thereto, and a solid electrolyte layer formed on the layer of the active material may be used as a separator, as shown in FIG. 2.

It is noted that the thickness of the solid electrolyte layer is not less than 1 μm and not more than 300 μm. If the thickness of the solid electrolyte layer is less than 1 μm, the solid electrolyte layer tends to be ruptured under the effect of the electrode surface to produce internal shorting. If the thickness of the solid electrolyte layer is larger than 300 μm, the solid electrolyte layer tends to be increased in volume to lower the energy density of the solid electrolyte cell. If the thickness of the solid electrolyte layer is not less than 1 μm and not more than 300 μm, the positive and negative electrodes can be isolated and insulated from each other more reliably to prevent internal shorting without lowering the energy density of the solid electrolyte cell. More preferably, the thickness of the solid electrolyte layer is not less than 5 μm and not more than 50 μm.

The thickness of the solid electrolyte layer is the sum of the thickness of the solid electrolyte layer formed on the layer of the active material for the positive electrode and that of the solid electrolyte layer formed on the layer of the active material for the negative electrode, and can be adjusted by adjusting the amount of the electrolyte solution coated on the active material layers.

More preferably, the thickness of the solid electrolyte layer is not less than 5 μm and not more than 50 μm, as described above. By setting the thickness of the solid electrolyte layer to not less than 5 μm, the internal shorting ratio of the solid electrolyte cell as a product can be suppressed to not more than 10%. On the other hand, by setting the thickness of the solid electrolyte layer to not more than 50 μm, it is possible to assure a volumetric energy density of not less than 300 Wh/l.

There is no limitation to the shape of the solid electrolyte cell of the present invention since it may be designed to be cylindrical, angular, coin-shaped or button-shaped, while it may be of any suitable different sizes, such as a thin size or a large size.

EXAMPLES

A flat-type gelated electrolyte cell, having the above structure, was prepared.

Example 1

A positive electrode was prepared as follows:

First, lithium carbonate and cobalt carbonate were mixed at a ratio of 0.5 mol to 1 mol, and the resulting mixture was fired in air at 900° C. for five hours to produce $LiCoO_2$ as an active material for the positive electrode.

91 parts by weight of $LiCoO_2$, thus obtained, 6 parts by weight of an electrically conductive agent and 10 parts by weight of the binder were mixed to prepare a positive electrode mixture. As the electrically conductive agent and as the binder, graphite and a copolymer of vinylidene fluoride and hexafluoro propylene were used, respectively.

Finally, the positive electrode mixture was dispersed in N-methyl-2-pyrrolidone to give a slurry which then was coated uniformly on a surface of an aluminum foil 20 μm thick serving as a positive electrode collector and was dried in situ to form a layer of an active material of the positive electrode. The resulting product was compression-molded in a roll press to prepare a positive electrode.

A negative electrode was prepared as follows:

First, 42.5 parts by weight of ethylene carbonate, 42.5 parts by weight of propylene carbonate and 15 parts by weight of $LiPF_6$ were mixed together to prepare a plasticizer.

Then, 30 parts by weight of the above plasticizer, 10 parts by weight of a copolymer of vinylidene fluoride and hexafluoropropylene and 60 parts by weight of tetrahydrofuran were mixed together to prepare a gelated electrolyte solution.

On the layer of an active material of the positive electrode and the layer of an active material of the negative electrode was evenly coated the above gelated electrolyte solution. The resulting assembly was allowed to stand at room temperature for eight hours to allow the gelated electrolyte solution to be impregnated in the layer of the active material of the positive electrode and the layer of the active material of the negative electrode. Finally, tetrahydrofuran, as a solvent of the solution of the gelated electrolyte, was vaporized off to form the layer of the gelated electrolyte on the layers of the active materials of the positive and negative electrodes.

The negative electrode impregnated with the gelated electrolyte and the positive electrode impregnated with the gelated electrolyte were placed face-to-face and pressure bonded together on the gelated electrolyte sides thereof to produce a flat-plate gelated electrolyte cell having an area of 2.5 cm by 4.0 cm and a thickness of 0.3 mm.

Example 2

A gelated electrolyte cell was prepared in the same way as in Example 1 except using a copolymer of vinylidene fluoride and hexafluoropropylene and polyvinyl fluoride as a positive electrode binder and as a negative electrode binder, respectively.

Example 3

A gelated electrolyte cell was prepared in the same way as in Example 1 except using polyvinylidene fluoride and a copolymer of vinylidene fluoride and hexafluoropropylene and as a positive electrode binder and as a negative electrode binder, respectively.

Example 4

A gelated electrolyte cell was prepared in the same way as in Example 1 except using polyvinylidene fluoride as the binders for the positive and negative electrodes, respectively.

In the following Examples 5 and 6, a gelated electrolyte was impregnated in the layer of the active material of one of the electrodes, while a gelated electrolyte was previously added to the electrode mixture of the other electrode.

Example 5

A positive electrode was prepared as follows:

First, lithium carbonate and cobalt carbonate were mixed together at a ratio of 0.5 mol to 1 mol and fired in air at 900° C. for five hours to prepare $LiCoO_2$ as an active material for the positive electrode.

42.5 parts by weight of ethylene carbonate, 42.5 parts by weight of propylene carbonate and 15 parts by weight of $LiPF_6$ were mixed together to prepare a plasticizer.

83 parts by weight of $LiCoO_2$, 6 parts by weight of the electrically conductive agent, 3 parts by weight of a binder and 8 parts by weight of the plasticizer were mixed together and dispersed in tetrahydrofuran to give a slurry. As the electrically conductive agent and as the binder, graphite and polyvinylidene fluoride were used, respectively.

This slurry was uniformly coated on a surface of a strip-shaped aluminum foil 20 μm thick operating as a positive electrode collector and dried in situ to form a layer of an active material of the positive electrode. The resulting product was compression-molded by a roll press to prepare a positive electrode.

A negative electrode was prepared as follows:

First, 90 parts by weight of pulverized graphite powders and 10 parts by weight of a binder were mixed together to prepare a negative electrode mixture. As the binder, a copolymer of vinylidene fluoride and hexafluoropropylene was used. The binder was dispersed in N-methyl-2-pyrrolidone to form a slurry, which was uniformly coated on a surface of a strip-shaped copper foil 10 μm thick operating as a negative electrode collector and was dried in situ to form a layer of an active material of the negative electrode. The resulting product was compression-molded in a roll press to prepare a negative electrode.

A gelated electrode solution was prepared as follows:

First, 42.5 parts by weight of ethylene carbonate, 42.5 parts by weight of propylene carbonate and 15 parts by weight of $LiPF_6$ were mixed together to prepare a plasticizer.

Then, 30 parts by weight of the above plasticizer, 10 parts by weight of a copolymer of vinylidene fluoride and hexafluoropropylene and 60 parts by weight of tetrahydrofuran were mixed together to prepare a gelated electrolyte solution.

A surface of the layer of an active material of the negative electrode was evenly coated with the above gelated electrolyte solution. The resulting assembly was allowed to stand at room temperature for eight hours to allow the gelated electrolyte solution to be impregnated in the layer of an active material of the negative electrode. Finally, tetrahydrofuran, as a solvent of the solution of the gelated electrolyte, was vaporized off to form a layer of the gelated electrolyte on the layer of the negative electrode.

The negative electrode impregnated with the gelated electrolyte and the positive electrode were placed face-to-face and pressure bonded together to produce a flat-plate gelated electrolyte cell having an area of 2.5 cm by 4.0 cm and a thickness of 0.3 mm.

Example 6

A positive electrode was prepared as follows:

First, lithium carbonate and cobalt carbonate were mixed together at a ratio of 0.5 mol to 1 mol and fired in air at 900° C. for five hours to prepare LiCoO2 as an active material for the positive electrode.

91 parts by weight of LiCoO2, 6 parts by weight of the electrically conductive agent and 10 parts by weight of the binder were mixed together to prepare a positive electrode mixture. As the electrically conductive agent and as the binder, graphite and polyvinylidene fluoride were used, respectively.

Finally, the positive electrode mixture was dispersed in N-methyl-2-pyrrolidone to give a slurry which was then coated uniformly on a sole side of an aluminum foil 20 μm thick operating as a positive electrode collector and was dried in situ to form a layer of a positive electrode active material. The resulting product was compression-molded by a roll press to prepare a positive electrode.

A negative electrode was prepared as follows:

First, 42.5 parts by weight of ethylene carbonate, 42.5 parts by weight of propylene carbonate and 15 parts by weight of $LiPF_6$ were mixed together to prepare a plasticizer.

Then, 65 parts by weight of pulverized graphite, 10 parts by weight of polyvinylidene fluoride, as a binder, and 25 parts by weight of the above plasticizer, were mixed together and dispersed in tetrahydrofuran to prepare a slurry.

Finally, this slurry was coated evenly on one surface of a strip-shaped copper foil, 10 μm thick, operating as a negative electrode collector, an was dried in situ to form a layer of an active material of the negative electrode. The resulting product was compression-molded on a roll press to prepare a negative electrode.

A gelated electrode solution was prepared as follows:

First, 42.5 parts by weight of ethylene carbonate, 42.5 parts by weight of propylene carbonate and 15 parts by weight of LiPF6 were mixed together to prepare a plasticizer.

Then, 30 parts by weight of the above plasticizer, 10 parts by weight of a copolymer of vinylidene fluoride and hexafluoropropylene and 60 parts by weight of tetrahydrofuran were mixed together to prepare a gelated electrolyte solution.

A surface of the layer of an active material of the positive electrode was evenly coated with the above gelated electrolyte solution. The resulting assembly was allowed to stand at room temperature for eight hours to allow the gelated electrolyte solution to be impregnated in the layer of an active material of the positive electrode. Finally, tetrahydrofuran, as a solvent of the solution of the gelated electrolyte, was vaporized off to form the layer of the gelated electrolyte on the layers of the active material of the positive electrode.

The negative electrode impregnated with the gelated electrolyte and the positive electrode impregnated with the gelated electrolyte were placed face-to-face and pressure bonded together to produce a flat-plate gelated electrolyte cell having an area of 2.5 cm by 4.0 cm and a thickness of 0.3 mm.

Example 7

A gelated electrolyte cell was prepared in the same way as in Example 1 except arraying a porous film of polyethylene as a separator between the positive and negative electrodes.

In the Comparative Example 1, shown below, a gelated electrode was sandwiched between the layer of an active material of the positive electrode and a layer of an active material of the negative electrode, to prepare a cell, without impregnating the layer of the active material with the gelated electrolyte. In the Comparative Example 2, a gelated electrolyte was previously mixed into the electrode mixture. In the Comparative Example 3, the gelated electrolyte was sandwiched between the layer of an active material of the positive electrode and a layer of an active material of the negative electrode, to prepare a cell, whilst a gelated electrolyte was previously mixed into the electrode mixture.

Comparative Example 1

A positive electrode was prepared as follows:

First, lithium carbonate and cobalt carbonate were mixed together at a ratio of 0.5 mol to 1 mol and fired in air at 900° C. for five hours to prepare $LiCoO_2$ as an active material for the positive electrode.

91 parts by weight of $LiCoO_2$, 6 parts by weight of the electrically conductive agent and 10 parts by weight of the binder were mixed together to prepare a positive electrode mixture. As the electrically conductive agent and as the binder, graphite and a copolymer of polyvinylidene fluoride and hexafluoropropylene were used, respectively.

Finally, the positive electrode mixture was dispersed in N-methyl-2-pyrrolidone to give a slurry which was then coated uniformly on a sole side of an aluminum foil 20 μm thick operating as a positive electrode collector and was dried in situ. The resulting product was compression-molded by a roll press to prepare a positive electrode.

A negative electrode was prepared as follows:

First, 90 parts by weight of pulverized graphite powders and 10 parts by weight of a binder were mixed to prepare a negative electrode mixture. As a binder, a copolymer of vinylidene fluoride and hexafluoropropylene was used. The binder was dispersed in N-methyl-2-pyrrolidone to form a slurry. This slurry was evenly coated on a sole surface of a strip-shaped copper foil, 10 μm thick, operating as a negative electrode collector, and was dried in situ to form a layer of an active material of the negative electrode, which was then compression-molded to form a negative electrode.

A gelated electrolyte was produced as follows:

First, 42.5 parts by weight of ethylene carbonate, 42.5 parts by weight of propylene carbonate and 15 parts by weight of $LiPF_6$ were mixed together to prepare a plasticizer.

To 30 parts by weight of the plasticizer were mixed 10 parts by weight of a copolymer of vinylidene fluoride and hexafluoropropylene and 60 parts by weight of tetrahydrofuran and dissolved to prepare a gelated electrolyte.

The gelated electrolyte was coated on a Teflon sheet to give a film of a gelated electrolyte which was sandwiched between a layer of an active material of the positive electrode and a layer of an active material of the negative electrode and pressure bonded together to prepare a flat-plate gelated electrolyte cell having an area of 2.5 cm by 4.0 cm and a thickness of 0.3 mm.

Comparative Example 2

A positive electrode was prepared as follows:

First, lithium carbonate and cobalt carbonate were mixed at a ratio of 0.5 mol to 1 mol. and the resulting mixture was fired in air at 900° C. for five hours to produce $LiCoO_2$ as an active material for the positive electrode.

42.5 parts by weight of ethylene carbonate, 42.5 parts by weight of propylene carbonate and 15 parts by weight of $LiPF_6$ were mixed together to prepare a plasticizer.

83 parts by weight of $LiCoO_2$, 6 parts by weight of the electrically conductive agent, 3 parts by weight of the binder and 8 parts by weight of the plasticizer were mixed together and dispersed in tetrahydrofuran to give a slurry. As the electrically conductive agent and as the binder, graphite and polyvinylidene fluoride were used, respectively.

Finally, this slurry was uniformly coated on a surface of a strip-shaped aluminum foil 20 μm thick, operating as a positive electrode collector, and was dried in situ to form a layer of an active material of the positive electrode. The resulting product was compression-molded by a roll press to prepare a positive electrode.

A negative electrode was prepared as follows:

42.5 parts by weight of ethylene carbonate, 42.5 parts by weight of propylene carbonate and 15 parts by weight of $LiPF_6$ were mixed together to prepare a plasticizer.

Then, 65 parts by weight of pulverized graphite powders, 10 parts by weight of polyvinylidene fluoride, as a binder, and 25 parts by weight of the plasticizer, were mixed together and dispersed in tetrahydrofuran to prepare a slurry.

Finally, this slurry was uniformly coated on a surface of a strip-shaped copper foil, 10 μm thick, operating as a positive electrode collector, and was dried in situ to form a layer of an active material of the negative electrode. The resulting product was compression-molded by a roll press to prepare a negative electrode.

The positive electrode and the negative electrode were placed face-to-face and pressure bonded together to form a flat-plate gelated electrolyte cell having an area of 2.5 cm by 4.0 cm and a thickness of 0.3 mm.

Comparative Example 3

A positive electrode was prepared as follows:

First, lithium carbonate and cobalt carbonate were mixed at a ratio of 0.5 mol to 1 mol, and the resulting mixture was fired in air at 900° C. for five hours to produce $LiCoO_2$ as an active material for the positive electrode.

42.5 parts by weight of ethylene carbonate, 42.5 parts by weight of propylene carbonate and 15 parts by weight of $LiPF_6$ were mixed together to prepare a plasticizer.

83 parts by weight of $LiCoO_2$, 6 parts by weight of the electrically conductive agent, 3 parts by weight of the binder and 8 parts by weight of the plasticizer were mixed together and dispersed in tetrahydrofuran to give a slurry. As the electrically conductive agent and as the binder, graphite and polyvinylidene fluoride were used, respectively.

This slurry was uniformly coated on a surface of a strip-shaped aluminum foil 20 μm thick, operating as a positive electrode collector, and was dried in situ to form a layer of an active material of the positive electrode. The resulting product was compression-molded by a roll press to prepare a positive electrode.

A negative electrode was prepared as follows:

42.5 parts by weight of ethylene carbonate, 42.5 parts by weight of propylene carbonate and 15 parts by weight of $LiPF_6$ were mixed together to prepare a plasticizer.

Then, 65 parts by weight of pulverized graphite powders, 10 parts by weight of polyvinylidene fluoride, as a binder, and 25 parts by weight of the plasticizer, were mixed together and dispersed in tetrahydrofuran to prepare a slurry.

This slurry was coated evenly on a sole surface of a strip-shaped copper foil, 10 μm thick, operating as a negative electrode collector, and was dried in situ to prepare a negative electrode.

A gelated electrolyte was prepared as follows:

First, 42.5 parts by weight of ethylene carbonate, 42.5 parts by weight of propylene carbonate and 15 parts by weight of $LiPF_6$ were mixed together to prepare a plasticizer.

To 30 parts by weight of the plasticizer were mixed 10 parts by weight of a copolymer of vinylidene fluoride and hexafluoropropylene and 60 parts by weight of tetrahydrofuran and dissolved to prepare a gelated electrolyte.

The gelated electrolyte was coated on a Teflon sheet to give a film of a gelated electrolyte which was sandwiched between a layer of an active material of the positive electrode and a layer of an active material of the negative electrode to prepare a flat-plate gelated electrolyte cell.

Evaluation of Characteristics

For each cell, prepared as described above, a theoretical capacity was found, and time rate discharge was carried out to evaluate the discharging capacity.

The evaluation was made under the conditions of room temperature of 23° C. First, for each cell, an upper limit of the charging voltage was set to 4.2 V, and the constant current constant voltage charging was carried out at a charging current of 6 mA. Each charged cell was then discharged at a constant current until a electrode voltage of 2.5 v was reached. For discharging, the current was set to 3 mA, 15 mA and to 30 mA for the 10-hour rate discharge, 2-hour rate discharge and to 1-hour rate discharge, respectively.

From the average voltage at the time of discharging, an output at each time rate discharging was found.

Table 1 shows a theoretical capacity and a discharge output for each of the cells of the Examples 1 to 7 and the Comparative Examples 1 to 3.

|  | theoretical capacity | discharging output (mWh) | | | |
| --- | --- | --- | --- | --- | --- |
|  | (mAh) | 1/C | 1/5C | 1/2C | 1C |
| Ex. 1 | 30.0 | 108.0 | 107.5 | 104.4 | 89.9 |
| Ex. 2 | 30.0 | 107.9 | 107.5 | 104.1 | 90.1 |
| Ex. 3 | 29.8 | 107.9 | 106.8 | 103.6 | 88.5 |
| Ex. 4 | 29.8 | 107.2 | 106.9 | 103.3 | 88.2 |
| Ex. 5 | 29.9 | 107.1 | 104.9 | 100.8 | 84.1 |
| Ex. 6 | 30.0 | 107.7 | 106.7 | 102.2 | 85.4 |
| Ex. 7 | 29.9 | 107.6 | 106.5 | 103.5 | 88.8 |
| Comp. Ex. 1 | 30.0 | 37.4 | 13.2 | 3.4 | <1.0 |
| Comp. Ex. 2 | 29.9 | 106.6 | 103.3 | 88.9 | 70.1 |
| Comp. Ex. 3 | 29.9 | 106.1 | 95.4 | 74.2 | 43.3 |

As may be seen from Table 1, in the Examples 1 to 6 in which the gelated electrolyte was impregnated in at least one of the layers of the active materials of the two electrodes, the cells having high discharging outputs and superior load characteristics were obtained. Also, from Example 7, it was seen that a cell having a high discharging output and superior load characteristics could be obtained even in case a separator was arranged between the positive and negative electrodes.

In the Comparative Example 1 in which the gelated electrode is not impregnated in the layer of an active material of the electrode and is sandwiched between the layers of the active material, the discharge output was low, whereas, in the Comparative Example 2 in which the gelated electrolyte is previously added to the electrode mixture, a sufficient output was not achieved. In the Comparative Example 3 in which part of the gelated electrolyte is added to the electrode mixture and the gelated electrolyte and is sandwiched between the layers of the active material, the discharge output could not be improved.

Thus, it has been found that, by applying the solution of the gelated electrolyte on the layer of an active material of the electrode and by impregnating the gelated electrolyte in the layer of an active material of the electrode, a cell can be obtained which has superior contact properties between the active material and the electrolyte and a high discharge output.

What is claimed is:

1. A solid electrolyte cell comprising:

a positive electrode having a positive current collector;

a positive layer of a first active material on the positive current collector;

a first solid electrolyte layer on the positive layer of the first active material and being impregnated into the positive layer of the first active material;

a negative electrode having a negative current collector;

a negative layer of a second active material on the negative current collector;

a second solid electrolyte layer on the negative layer of the second active material and being impregnated into the negative layer of the second active material;

a first sheathing material holding the positive electrode;

a second sheathing material holding the negative electrode; and a hot melt material bonding the sheathing materials together.

2. The solid electrolyte cell according to claim 1 wherein said solid electrolyte contains a high-molecular matrix material and is in a gelated state.

3. The solid electrolyte cell according to claim 1 wherein at least one of the active layers contains a binder and the binder has the same composition as the high-molecular matrix material.

4. The solid electrolyte cell according to claim 3 wherein the high-molecular matrix material and the binder are a fluorine-based high-molecular material.

5. The solid electrolyte cell according to claim 4 wherein the fluorine-based high-molecular material is polyvinylidene fluoride.

6. The solid electrolyte cell according to claim 4 wherein the fluorine-based high-molecular material is a copolymer of vinylidene fluoride and hexafluoropropylene.

7. The solid electrolyte cell according to claim 1 wherein the negative electrode contains a material capable of doping/undoping lithium.

8. The solid electrolyte cell according to claim 7 wherein the material capable of doping/undoping lithium is a carbon material.

9. The solid electrolyte cell according to claim 1 wherein the positive electrode contains a compound oxide of lithium and a transition metal.

10. The solid electrolyte cell according to claim 1 wherein said solid electrolyte layer is formed on each of a layer of an active material of a positive electrode and a layer of an active material of a negative electrode, with the solid electrolyte layers being in contact with each other.

11. The solid electrolyte cell according to claim 1 wherein said solid electrolyte layer is formed on each of a layer of an active material of a positive electrode and a layer of an active material of a negative electrode, with the solid electrolyte layers facing each other with a separator in-between.

12. A solid electrolyte cell according to claim 1, wherein the solid electrolyte layer has a thickness in a range of 1 $\mu$m to 300 $\mu$m.

13. A solid electrolyte cell according to claim 12, wherein the thickness range for the solid electrolyte layer is 5 $\mu$m to 50 $\mu$m.

14. A solid electrolyte cell comprising:
a positive electrode having a positive current collector, a positive layer of a first active material on the positive current collector, and a first solid electrolyte layer on the positive layer of the first active material and being impregnated into the positive layer of the first active material;

a negative electrode having a negative current collector, a negative layer of a second active material on the negative current collector, and a second solid electrolyte layer on the negative layer of the second active material and being impregnated into the negative layer of the second active material;

a separator;

said electrodes being arranged with the first and second solid electrolyte layers facing each other with the separator disposed therebetween;

separating the positive electrode from the negative electrode;

a first sheathing material holding the positive electrode;

a second sheathing material holding the negative electrode; and a hot melt material bonding the sheathing materials together.

15. A solid electrolyte cell of claim 14, wherein each solid electrolyte layer has a thickness in a range of 1 $\mu$m to 300 $\mu$m.

16. A solid electrolyte cell of claim 15, wherein the thickness of each solid electrolyte layer is in a range of 5 $\mu$m to 50 $\mu$m.

* * * * *